United States Patent [19]

Rannenberg

[11] Patent Number: 4,550,573

[45] Date of Patent: Nov. 5, 1985

[54] MULTIPLE LOAD, HIGH EFFICIENCY AIR CYCLE AIR CONDITIONING SYSTEM

[75] Inventor: George C. Rannenberg, Canton, Conn.

[73] Assignee: United Technologies Corporation, Hartford, Conn.

[21] Appl. No.: 560,613

[22] Filed: Dec. 12, 1983

[51] Int. Cl.[4] .......................................... F25B 19/02
[52] U.S. Cl. ........................................ 62/172; 62/401; 62/87
[58] Field of Search ............... 62/172, 175, 401, 402, 62/87; 98/1.5

[56] References Cited

U.S. PATENT DOCUMENTS

| | | | |
|---|---|---|---|
| 2,618,470 | 11/1952 | Brown et al. | 257/9 |
| 2,772,621 | 12/1956 | Arnoldi | 62/172 |
| 3,080,728 | 3/1963 | Groves et al. | 62/172 |
| 3,097,508 | 7/1963 | Leech et al. | 62/402 |
| 3,177,679 | 4/1965 | Quick et al. | 62/402 |
| 3,208,234 | 9/1965 | Messinger | 62/172 |
| 3,326,109 | 6/1967 | Markham | 98/1.5 |
| 3,369,777 | 2/1968 | Furlong | 244/59 |
| 4,209,993 | 7/1980 | Rannenberg | 62/80 |
| 4,261,416 | 4/1981 | Hamamoto | 165/23 |
| 4,265,397 | 5/1981 | Rannenberg | 237/2 B |
| 4,283,924 | 8/1981 | Schütze | 62/402 |
| 4,295,518 | 10/1981 | Rannenberg | 165/2 |
| 4,321,191 | 1/1982 | Biagini | 62/402 |

*Primary Examiner*—William E. Wayner
*Assistant Examiner*—John M. Sollecito
*Attorney, Agent, or Firm*—John Swiatocha

[57] ABSTRACT

An air cycle air conditioning system (10) for rgulating the temperature and pressure of diverse loads includes open and closed loop sections (12) and (16). A first load (14) requiring heating or cooling with constantly supplied fresh air is provided with chilled air from first turbine (75) and warm air from first bypass valve (50). A second load (20) which can be heated or cooled with a supply of recirculating air is provided with chilled air from second turbine (130) and warm air from a second bypass valve (170). Air is supplied to the second turbine from a compressor driven by the first turbine whereby the first turbine maintains the temperature of both loads either by the direct supply of air thereto or by driving another turbo-compressor system.

7 Claims, 2 Drawing Figures

MULTIPLE LOAD, HIGH EFFICIENCY AIR CYCLE AIR CONDITIONING SYSTEM

DESCRIPTION

1. Technical Field

This invention relates generally to air cycle air conditioning systems and more particularly to such air conditioning systems and more particularly to such air conditioning systems useful in the temperature and pressurizing of a first load with fresh air as well as the temperature regulation of a second load with recirculating air.

2. Background Art

Air cycle air conditioning systems are well known and have become commonplace for the cooling and pressurizing of loads such as passenger cabins and equipment compartments in both commercial and military aircraft. One reason for the popularity of such systems is the substantial amount of cooling available from air cycle systems of relatively modest size. Another reason is the adaptability of such systems to gas turbine engine powered vehicles such as aircraft and, most recently, military land vehicles such as battle tanks, the compressor discharge section of the gas turbine engine providing a convenient source of pressurized refrigerant air for the system.

In typical commercial and military aircraft, temperature and pressure regulation of both passenger (crew) and equipment compartments are required from the aircraft's air cycle air conditioning system. For maintenance of sufficient quantities of breathable air in the passenger compartment, it has been the practice to heat or cool and regulate the pressure of such a load by an open-loop air cycle air conditioning system. In such a system, stale air from the load is continuously exhausted overboard, the pressure and temperature of the compartment being continuously maintained at desired levels by a supply of fresh (ambient) air heated or cooled as required and supplied to the compartment at an inlet thereof. While such open-loop air cycle air conditioning systems provide effective temperature and pressure regulation in such loads as passenger compartments, in the case of a load such as an equipment compartment which requires cooling and can tolerate recirculated coolant, temperature regulation may be accommodated more efficiently with a single supply of air recirculated therethrough.

Accordingly, it will be appreciated that for optimum efficiency in the temperature and pressure regulation of a first load which requires a continuous supply of fresh air, and of a second load the temperature of which may be regulated by recirculated air, two separate air cycle conditioning systems may be desirable. However, in implementing such dual-system temperature and pressure regulation, any advantages associated with cooling the second load by recirculated air may be more than offset by the expense and bulk of two distinct air conditioning systems. Therefore, it may at first seem that utilization of a single open-loop prior art air cycle, air conditioning system with enough capacity to satisfy both loads may be an efficient way to handle the diverse temperature and pressure regulation requirements associated with such loads. Indeed, a single system would involve less redundancy and therefore, probably be less complex than two systems. However, such a single system would, at any given time more likely than not, consume more operating power than dual systems. A single open-loop system would be required to operate at output levels sufficient to meet the most severe heating and cooling requirements of either load whether or not such output from the system is required. With dual systems, the output and therefore the input power requirement of each system may be tailored to its respective load.

DISCLOSURE OF INVENTION

Therefore, it is among the objects of the present invention to provide an improved air cycle air conditioning system capable of efficiently regulating the temperature and pressure of a pair of diverse loads, one requiring the continuous supply of fresh air thereto and the other being capable of being heated or cooled by recirculated air.

This and other objects will become more evident from the following detailed description taken in connection with the appended claims and accompanying drawings. These objects are achieved by the single air cycle air conditioning system of the present invention wherein the input power associated with a supply of pressurized air to the system drives and charges a first, open-loop portion of the system for temperature and pressure regulation of one of the loads, rotational shaft power produced by the open-loop portion of the system powering a closed-loop portion of the system for the temperature regulation of the other load. In the preferred embodiment, the input power to the system is provided by a source of pressurized air such as, for example, from the compressor discharge section of a gas turbine powering a vehicle carrying the two loads. The pressurized air drives a first (open-loop) turbine which expands and delivers temperature regulated air to the first load, such as the cabin of the aircraft which requires ventilation with fresh air. In addition to supplying the first load with fresh air, the open-loop turbine, drives a closed-loop compressor which compresses a relatively constant supply of recirculating air for subsequent expansion by a second turbine which provides a measure of input power to the closed loop compressor or a second compressor communicating serially therewith. After expansion in the second turbine, the recirculating air is delivered to a second load. Accordingly, it is seen that substantially all the energy available from the air source which charges and drives the system is used in cooling or heating and pressurizing the two loads. Thus, both fresh temperature and pressure regulation and recirculated temperature regulation of a pair of air conditioning loads is achieved with a single air cycle air conditioning system characterized by an economy of structure and a minimization of input power requirements thereto.

BEST MODE FOR CARRYING OUT THE INVENTION AND INDUSTRIAL APPLICABILITY THEREOF

Figure 1:
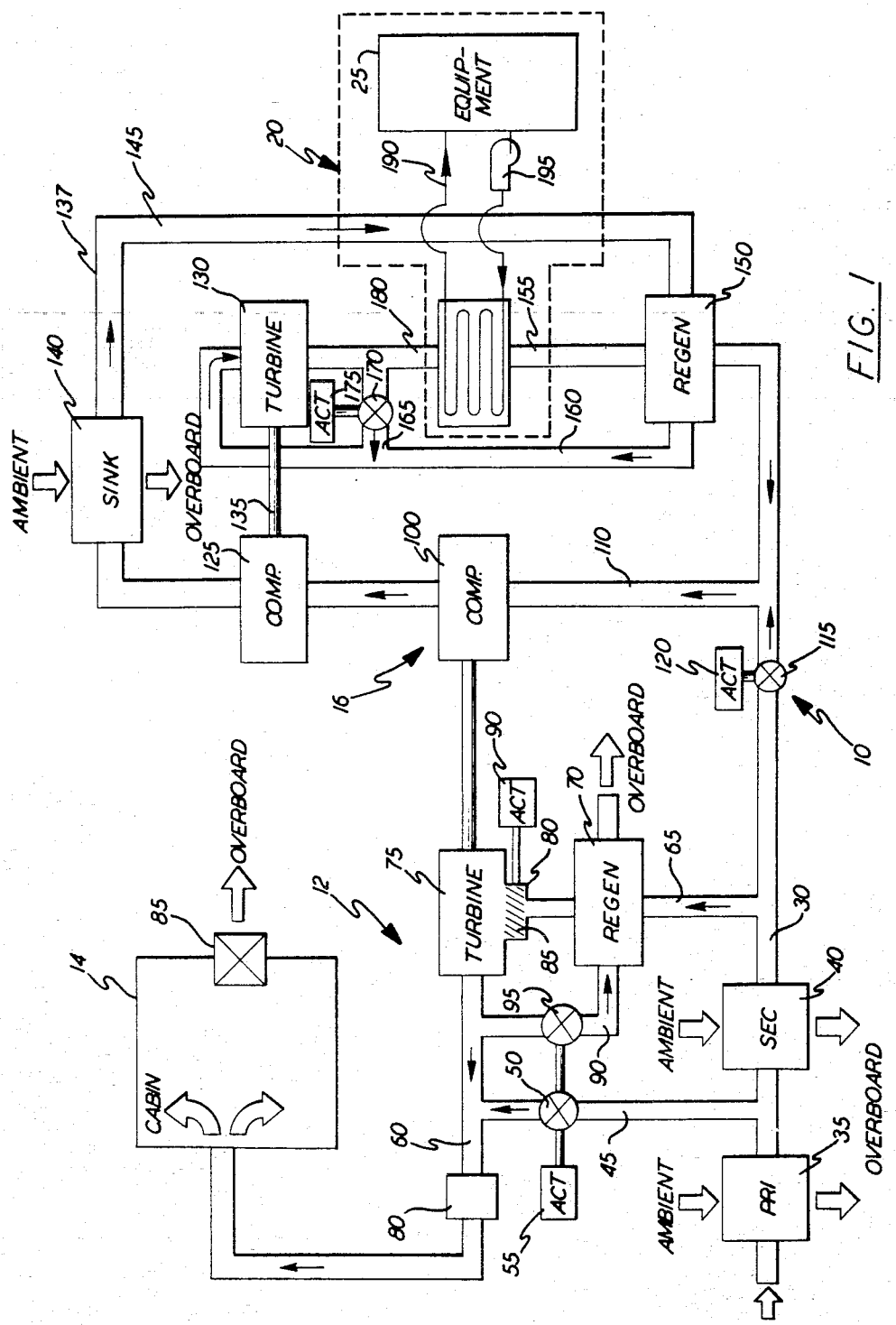
FIG. 1 is a schematic representation of a preferred embodiment of the air cycle air conditioning system of the present invention.

Referring to FIG. 1, the air cycle air conditioning system of the present invention is indicated generally at 10 having a first, open-loop portion 12 which heats or cools and pressurizes a first load 14 such as the cabin of a commercial or military aircraft as well as a second closed-loop portion 16 which heats or cools a second load 20 including a compartment 25, such as an electrical equipment compartment, the temperature of which may be regulated by a relatively constant supply of suitable cooling fluid recirculating therethrough.

Air for maintaining an appropriate charge of refrigerant air and for powering air conditioning system 10, enters the system through the left-hand end of main inlet duct 30 from a suitable source such as the compressor section (not shown) of a gas turbine engine. Duct 30 has primary and secondary heat exchangers 35 and 40, respectively, disposed therein, the air being cooled in those heat exchangers by a flow of any suitable coolant such as ambient air. A portion of the air is ducted through conduit 45 and open-loop turbine bypass valve 50 set by actuator 55 to cabin inlet duct 60. The remainder of the supply air is ducted through turbine inlet duct 65 having regenerative heat exchanger 70 disposed therewithin, and then through turbine 75 to cabin inlet duct 60. Turbine 75 is provided with a variable area inlet 80 which may be of the type which includes a plurality of movable vanes 85 set by actuator 90 connected thereto. As the pressurized air moves through turbine 75, it performs work on the turbine, turning the turbine rotor and expanding itself whereby the temperature and pressure of the air are lowered significantly. A portion of the cool air exhausted from turbine 75 is mixed with the uncooled air ducted to conduit 60 by conduit 45, the mixture flowing through a water separator 80 where the airflow is dried and finally ducted into cabin 14. Stale air is continuously exhausted overboard from cabin 14 through outlet cabin pressure regulating valve 85 and replaced by fresh air continuously supplied to the cabin through duct 60. The remainder of the air exhausted from turbine 75 is ducted through conduit 90, passing through control valve 95 and regenerative heat exchanger 70 where the air absorbs heat from the air supplied to turbine 75 through conduit 65 for enhanced refrigeration potential at the exit of turbine 75. Valve 95 which controls airflow through conduit 90, is mechanically connected to valve 50 and sequentially operated therewith by actuator 55. After passing through the regenerative heat exchanger the air in conduit 90 is exhausted overboard.

The heating, cooling and pressurization of cabin 15 may be controlled by controlling the flow of expanded and chilled air through turbine 75 and relatively warmer, unchilled air through duct 45. In a situation where maximum cabin heating is required, such as in the high altitude operation of the aircraft, inlet nozzle 80 of turbine 75 is closed off by actuator 90. Actuator 55 sequentially closes valve 95 to reduce and then cut off the flow of chilled air through the regenerative heat exchanger and then gradually opens valve 50 to its maximum flow area to maximize the amount of warm air ducted to the cabin from supply conduit 30. In the event that cooling of the cabin is required, actuator 90 adjusts guide vanes 85 in inlet nozzle 80 to increase the amount of air admitted to turbine 75 thereby increasing the exhaust flow of cool air from the turbine. Actuator 55 sequentially closes valve 50 to cut off the flow of uncooled supply air to turbine exhaust conduit 60 and then opens valve 95 for enhanced precooling of turbine inlet air within regenerative heat exchanger 70, thereby further enhancing the cooling provided to the cabin through duct 60.

It will be understood that enough pressurized supply air must be supplied to the air conditioning system 10 to satisfy the heating and cooling demands of both cabin 15 and compartment 25. It is readily apparent that no further use may be made of the energy remaining within the refrigerant air exhausted overboard from the cabin. Thus, the amount of refrigerant air exhausted overboard should be kept to a minimum. In the case where one of the loads comprises equipment which may be cooled by a recirculation of a charge of closed-loop refrigerant air, air conditioning of such a load is efficiently accomplished with system 10 by utilization in closed-loop portion 16 of the kinetic energy imparted to the rotor of open-loop turbine 75 by airflow through that device. To this end, the rotor of turbine 75 is connected to the rotor of a closed-loop compressor 100 by a shaft 105 whereby the rotation of the turbine rotor drives the compressor rotor to precompress air flowing through duct 110. This duct is supplied with air from the source through inlet control valve 115 in duct 30. The flow area of valve 115 is set by actuator 120, which opens the valve when the supply of refrigerant air circulating within the closed-loop portion of the system needs replenishment due to, for example, slow leakage therefrom.

Compressed air is exhausted from compressor 100 to compressor 125 where the pressure of the air is further increased, compressor 125 being driven by the rotation of the rotor of turbine 130 connected to the rotor of compressor 125 by shaft 135. Air exhausted from compressor 125 is ducted through conduit 137 to a sink heat exchanger 140 where the air is cooled by the absorption of heat therefrom by any suitable coolant such as ambient air. From sink heat exchanger 140, the air is ducted through conduit 145 to the high pressure section of a regenerative heat exchanger 150 in which the air is further cooled by the absorption of heat therefrom by chilled turbine, exhaust air ducted to a low pressure section of heat exchanger 150 through conduit 155. From the high pressure section of heat exchanger 150, the compressed air is ducted to closed-loop expansion turbine 130 through conduit 160, a portion of the air bypassing turbine 130 through conduit 165 having control valve 170 disposed therein, valve 170 being set by actuator 175. Air which does not bypass turbine 130 through branch conduit 165 passes through this turbine, is expanded and chilled therewithin, and drives the turbine rotor for powering compressor 125.

The chilled air from turbine 130 is ducted to load 20 through exhaust conduit 180. As shown, load 20 comprises a load heat exchanger 185, equipment compartment 25 and a heat exchange fluid circulatory loop 190 therebetween, the circulation of liquid in the direction of the arrows being maintained by a pump 195 provided in the loop. Turbine exhaust air ducted to heat exchanger 185 cools the liquid circulating within the loop 190 which is then pumped to equipment 25, absorbing heat therefrom and pumped back to heat exchanger 185 for further cooling. From heat exchanger 185, the now slightly warmed turbine exhaust air is ducted to regenerative heat exchanger 150 through duct 155 for precooling the closed-loop turbine inlet air. In the event that less cooling or heating of equipment 25 is required, actuator 175 opens bypass valve 170 thereby bypassing turbine 130 with air discharged from compressor 125 through conduits 137, 145 and 160, such bypass air then being channeled to load heat exchanger 185 through turbine exhaust conduit 180.

Figure 2:
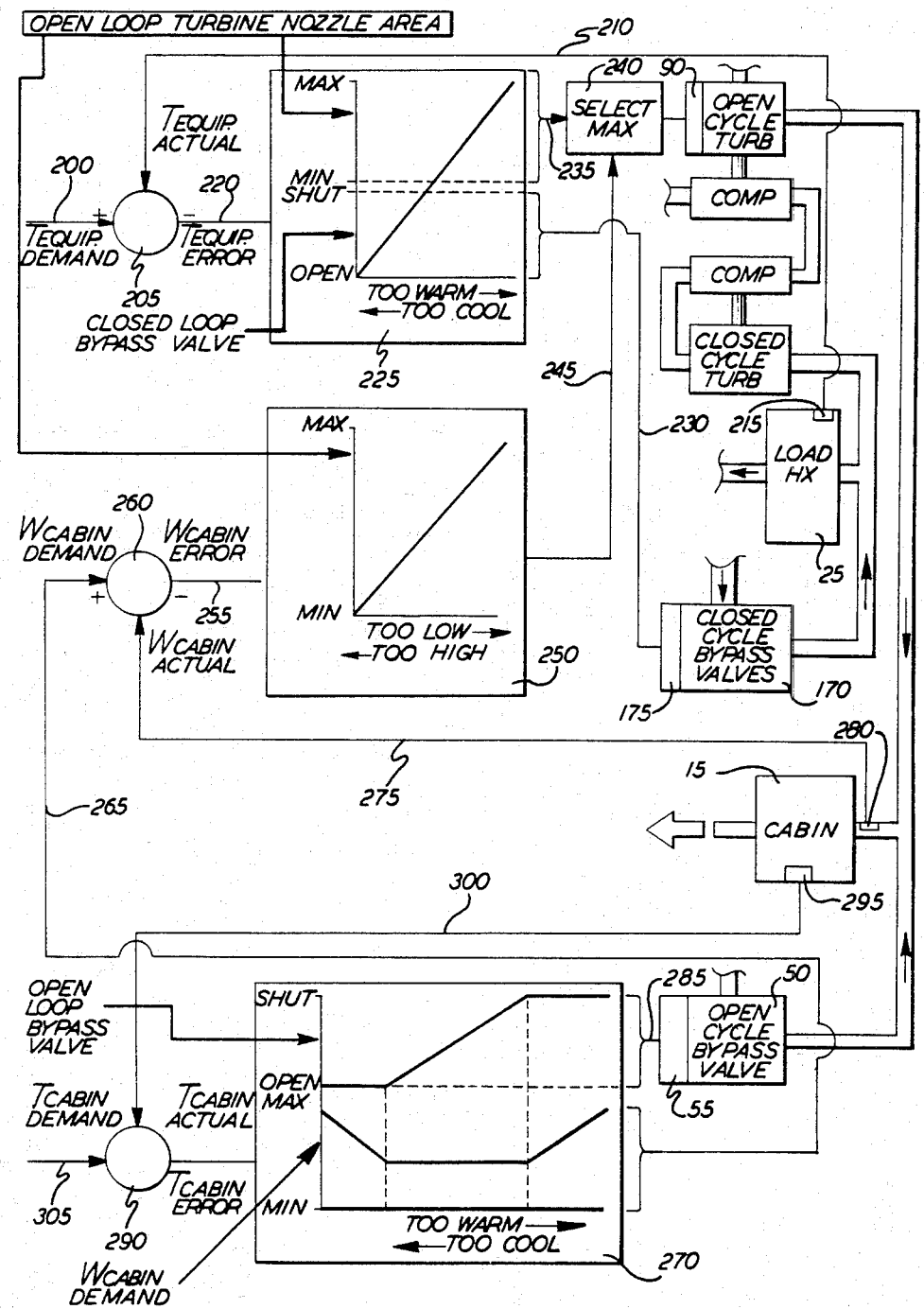
FIG. 2 is a schematic representation of a control system typical of that used to regulate the air conditioning system of the present invention.

Control of air conditioning system 10 may be implemented by any suitable control system such as analog or digital, general purpose or special purpose computers. By way of example, a representative control circuit is shown in FIG. 2 wherein a signal $T_{EQUIP\ DEMAND}$ indicative of the temperature (usually a constant) required to be maintained within equipment compartment 25 is fed through line 200 to a first summing junction or difference circuit 205. A signal $T_{EQUIP\ ACTUAL}$ is input through line 210 to summing junction 105 from a suitable transducer such as a thermocouple 215 disposed within compartment 25. Junction 205 takes the difference between these two signals and inputs the difference as an equipment temperature error signal ($T_{EQUIPMENT\ ERROR}$) through line 220 to analog function generator or digital data lookup memory 225. Memory 225 provides an output signal indicative of either an adjusted setting in the nozzle area of open-loop turbine 75 or the flow area of closed-loop bypass valve 170 in response to the equipment temperature error signal.

As indicated in FIG. 2, if the error signal corresponds to the equipment being too warm, the output of memory 225 will first be indicative of a closing of bypass valve 170 and then an opening of turbine inlet nozzle 80. Likewise, if the error signal corresponds to the temperature of the equipment being too low, the output of memory 225 will first correspond to a closing of turbine inlet nozzle 80 and then an opening of bypass valve 170. In the event that the output from memory 225 corresponds to an adjustment in bypass valve area, this output signal is fed to actuator 175 through line 230, the actuator adjusting the area of valve 170 to minimize the error between the actual temperature in equipment compartment 25 and the desired temperature thereof. In the event that the output of memory 225 corresponds to a signal indicating adjustment of the flow area of turbine inlet nozzle 80, this output signal is fed through line 235 to select MAX circuit 240. Another input is provided thereto to select MAX circuit 240 through line 245 and comprises an output signal from function generator or memory 250 indicative of the turbine nozzle area required to achieve that airflow through the cabin necessary to maintain a desired temperature thereof. To prevent overheating of either the cabin or the equipment, select MAX circuit 240 selects the input signal thereto of greatest magnitude and passes this signal to actuator 90 which sets the area of turbine inlet nozzle 80 in accordance with that signal to satisfy the largest of the cabin and equipment cooling requirements.

The output function generator (memory) 250 is indicative of the cabin airflow required to maintain a desired cabin temperature. The input to memory 250 through line 255 is a signal indicative of an error between actual cabin airflow and the cabin airflow required to achieve a desired temperature therein. This signal represents the difference taken by summing junction 260 of a signal $W_{DEMAND}$ (required airflow) provided through line 265 from function generator 270 and a signal $W_{ACTUAL}$ (actual airflow) input through line 275 from a transducer such as a flow meter 280 at the cabin inlet.

In addition to a signal indicative of required airflow to the cabin from turbine 75, memory 270 provides an output signal along line 285 to actuator 55 indicative of the setting of bypass valve 50 required to achieve a desired cabin temperature. The input to memory 270 comprises a signal ($T_{CABIN\ ERROR}$) input thereto through line 290. This input signal is the output from summing junction 290 and represents the difference between a signal ($T_{CABIN\ ACTUAL}$) indicative of actual cabin temperature and provided by thermocouple 295 within cabin 15 through line 300, and a signal ($T_{CABIN\ DEMAND}$) indicative of desired cabin temperature and provided to junction 290 through line 305. If the error signal corresponds to the cabin being too warm, as shown in the figure, the output from memory 270 will correspond first to bypass valve 50 remaining fully open while cabin flow demand is reduced; the valve area then increasing while cabin flow demand remains constant and, finally, cabin flow demand increasing while the bypass valve is held closed. Similarly, if the error signal corresponds to the cabin being too cool, the output signals from memory 270 will first correspond to the bypass valve remaining closed while the cabin flow demand is decreased to a constant value at which point the output signals correspond to a decreasing bypass valve area at a constant cabin flow demand; and then, an increasing cabin flow demand as the bypass valve remains fully open.

From the foregoing, it will be seen that a desired cabin temperature is maintained by controlling the airflow thereto. Such airflow control is achieved by controlling the inlet nozzle area of turbine 75 as well as the flow of unchilled air to the cabin through bypass valve 50. Similarly, the desired equipment temperature is maintained by controlling the flow of unchilled air admitted thereto through bypass valve 170 as well as the overall airflow circulated through the closed loop portion of the system by compressor 100. Control of compressor 100 is achieved by controlling the input power thereto by means of the control of airflow through open-loop turbine 75 which drives the compressor.

It is thus seen that the air cycle air conditioning system of the present invention provides the cooling and pressurization of diverse loads with maximum efficiency and minimal hardware. The connection between the rotors of turbine 75 and compressor 100 in essence, enables turbine 75 to cool both loads, the cabin load by the supply of fresh air thereto and the equipment load by the driving of compressor 100 and thus compressor 125 and turbine 130.

While a single embodiment of the present invention has been shown, it will be understood that various modifications will, from the disclosure herein, suggest themselves to those skilled in the art. For example, while a pair of serially connected compressors are employed in the heating and cooling of the equipment load, it will be appreciated that a single compressor driven by both turbines 75 and 130 on a single shaft may be employed without departing from the invention. Similarly, while as described, the cooling of both loads employs regenerative heat exchange, where load heating and cooling demands may be met without such regenerative heat exchange, for purposes of economy of structure, such regenerative heat exchange may be eliminated without departure from this invention. Therefore, it is the intention of the following claims to cover these and any other modifications which may fall within the true spirit and scope of this invention.

Having thus described the invention, what is claimed is:

1. An air cycle air conditioning system characterized by:
  a first load requiring the maintenance of the temperature and pressure thereof by fresh air continuously supplied thereto and subsequently discharged therefrom;

a first turbine having an inlet and an outlet and adapted for communication with, and driven by a source of pressurized air, said first turbine expanding and chilling said pressurized air and discharging said expanded and chilled air to said first load;

first means, providing fluid communication between the inlet of said first turbine and said pressurized air source;

a first compressor having an inlet and an outlet and connected to, and driven by said first turbine and being adapted for the pressurization of a quantity of air circulated therethrough;

a second turbine having an inlet and an outlet and being connected to said first compressor for providing a measure of input power thereto;

second means providing fluid communication between the outlet of said first compressor and the inlet of said second turbine, said second turbine being driven by an expanding and chilling said air supplied thereto from said first compressor;

a second load isolated from said expanded and chilled air discharged to said first load by said first turbine, said second load being capable of having the pressure and temperature thereof maintained by chilled air recirculated therethrough, said chilled air being ducted to said second load from said second turbine; and third means providing fluid communication between the outlet of said second load with the inlet of said first compressor whereby substantially all the air supplied to said second load by said second turbine is returned from said second load to said first compressor and subsequently to said second turbine for continuous recirculation through said first compressor, said second turbine and said second load, thereby efficiently cooling and pressurizing said second load under power from said first turbine.

2. An air cycle air conditioning system characterized by:

a first load requiring the maintenance of the temperature and pressure thereof by fresh air continuously supplied thereto and subsequently discharged therefrom;

a first turbine having an inlet and an outlet and adapted for communication with, and driven by a source of pressurized air, said first turbine expanding and chilling said pressurized air and discharging said expanded and chilled air to said first load;

first means, providing fluid communication between the inlet of said first turbine and said pressurized air source;

a first compressor having an inlet and an outlet and connected to, and driven by said first turbine and being adapted for the pressurization of a quantity of air circulated therethrough;

a second turbine having an inlet and an outlet;

second means providing fluid communication between the outlet of said first compressor and the inlet of said second turbine, said second fluid communication means comprising a second compressor having an inlet and an outlet and being connected to, and at least in part driven by said second turbine, said second compressor communicating at an inlet thereof with the outlet of said first compressor and at an outlet thereof, with the inlet of said second turbine for receiving said air compressed by said first compressor, said second compressor further compressing said air and discharging said air for expansion and cooling thereof, to said second turbine;

a second load isolated from said expanded and chilled air discharged to said first load by said first turbine, said second load being capable of having the pressure and temperature thereof maintained by chilled air recirculated therethrough, said chilled air being ducted to said second load from said second turbine; and third means providing fluid communication between the outlet of said second load with the inlet of said first compressor whereby substantially all the air supplied to said second load by said second turbine is returned from said second load to said first compressor and subsequently to said second turbine for continuous recirculation through said first compressor, said second turbine and said second load, thereby efficiently cooling and pressurizing said second load under power from said first turbine.

3. The air cycle air conditioning system of claim 2 characterized by an inlet control valve communicating with said third fluid communication means and providing fluid communication between said source of said pressurized air and said first compressor for supplementing said quantity of air circulated through said second load.

4. The air cycle air conditioning system of claim 3 characterized by said pressurized air being supplied to said inlet valve in said third fluid communication means from said first fluid communication means.

5. The air cycle air conditioning system of claim 1 characterized by said first turbine being provided with a or 2 variable area inlet said inlet being adjustable in response to the greatest of the cooling demands of said first and second loads.

6. The air cycle air conditioning system of claim 1 or 2 characterized by fourth means providing fluid communication between the outlet of said first turbine and said first fluid communication means, said fourth fluid communication means including a first bypass valve therein, the flow area of said first turbine bypass valve, and therefore, the amount of uncooled pressurized air from said source thereof ducted through said first bypass valve to the exhaust of said first turbine being adjustable in response to the warming demand of said first load.

7. The air cycle air conditioning system of claim 1 or 2 characterized by fifth means providing fluid communication between the outlet of said second turbine and said second fluid communication means, said fifth fluid communication means including a second turbine bypass valve therein, the flow area of said second turbine bypass valve and therefore, the amount of uncooled compressed air from said first compressor ducted through said second bypass valve to the exhaust of said second turbine being adjustable in response to the warming demand of said second load.

* * * * *

UNITED STATES PATENT AND TRADEMARK OFFICE
CERTIFICATE OF CORRECTION

PATENT NO. : 4,550,573

DATED : November 5, 1985 (Page 1 of 2)

INVENTOR(S) : George C. Rannenberg

It is certified that error appears in the above-identified patent and that said Letters Patent is hereby corrected as shown below:

IN THE ABSTRACT, Line 2, "rgulating" should be --regulating--.

IN THE DRAWINGS, Sheet 1, Fig. 1:

Reference numeral "90" indicating the actuator located adjacent turbine "75" should be changed to --92--.

The shaft connecting turbine "75" and compressor "100" should be indicated by reference numeral --105--.

The load heat exchanger located between conduits "155" and "180" should be indicated by reference numeral --185--.

The direction of arrow "165" should be reversed.

Col. 1, Lines 9-10, delete "and more particularly to such air conditioning systems".

Col. 3, Line 47, "15" should be --14--.

Col. 3, Line 53, "90" should be --92--.

UNITED STATES PATENT AND TRADEMARK OFFICE
CERTIFICATE OF CORRECTION

PATENT NO. : 4,550,573

DATED : November 5, 1985 (Page 2 of 2)

INVENTOR(S) : George C. Rannenberg

It is certified that error appears in the above-identified patent and that said Letters Patent is hereby corrected as shown below:

Col. 4, Line 4, "15" should be --14--.

Col. 8, Claim 5, Line 37, after "1" --or 2-- should be inserted.

Col 8, Claim 5, Line 39, before "variable" delete "or 2".

Signed and Sealed this

Twenty-first Day of November, 1989

Attest:

JEFFREY M. SAMUELS

*Attesting Officer*    *Acting Commissioner of Patents and Trademarks*